United States Patent

[11] 3,596,738

| [72] | Inventor | Charles Newstead<br>Walsall, England |
|---|---|---|
| [21] | Appl. No. | 822,477 |
| [22] | Filed | May 7, 1969 |
| [45] | Patented | Aug. 3, 1971 |
| [73] | Assignee | Girling Limited<br>Tyseley, England |
| [32] | Priority | May 9, 1968 |
| [33] | | Great Britain |
| [31] | | 21,936/68 |

[54] VEHICLE SHOE DRUM BRAKES
3 Claims, 16 Drawing Figs.

[52] U.S. Cl. .................................................. 188/78,
  74/89.2, 74/108, 188/325, 192/75, 192/93 R
[51] Int. Cl. ........................................................ F16d 51/22
[50] Field of Search ............................................ 188/78,
  78.22, .7; 106 F; 74/96, 108, 89.2; 192/75, 93

[56] References Cited

UNITED STATES PATENTS

| 2,777,542 | 1/1957 | Russell ......................... | 188/78 |

FOREIGN PATENTS

| 469,841 | 8/1937 | Great Britain ................ | 188/78 |
| 495,834 | 11/1938 | Great Britain ................ | 188/78 |
| 842,156 | 7/1960 | Great Britain ................ | 188/78 |

*Primary Examiner*—George E. A. Halvosa
*Attorney*—Scrivener, Parker, Scrivener and Clarke

ABSTRACT: The invention relates to an internal shoe drum brake of the type in which an expansion movement is imparted to the brakeshoes through thrust members which in turn are moved apart by cams having cam surfaces in rolling contact with one another, the rolling motion of the cams being controlled by a pull rod. In such a brake construction, the invention provides a flexible strap or a pivotal link between the pull rod and each cam, the strap or the link being pivoted to the cam. Additionally, the invention provides for articulated engagement of each cam with the cooperating thrust member.

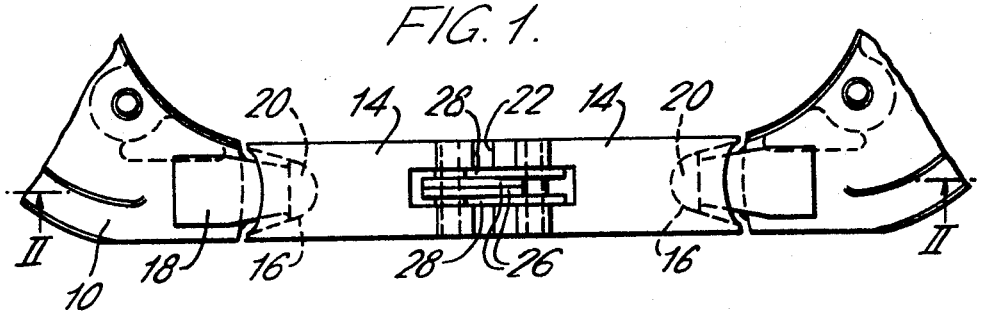
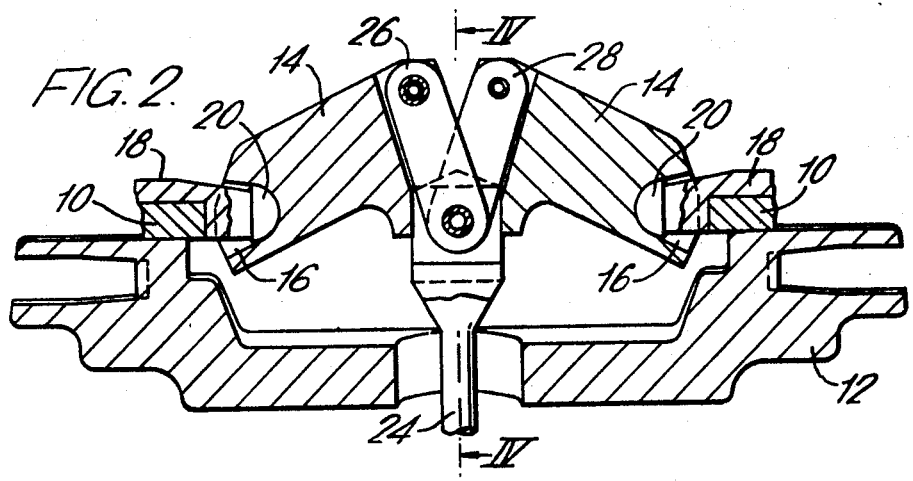
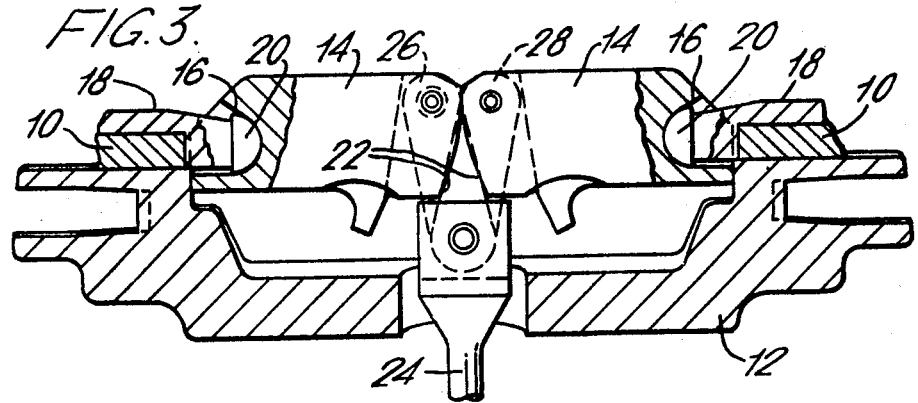

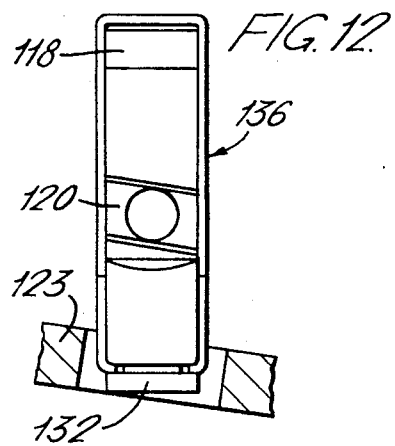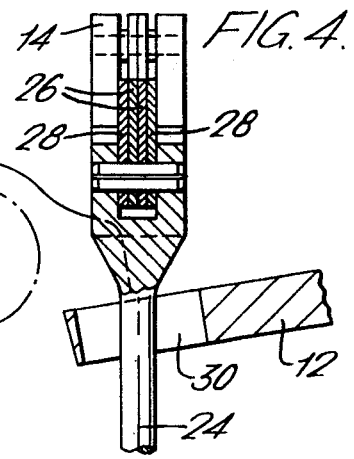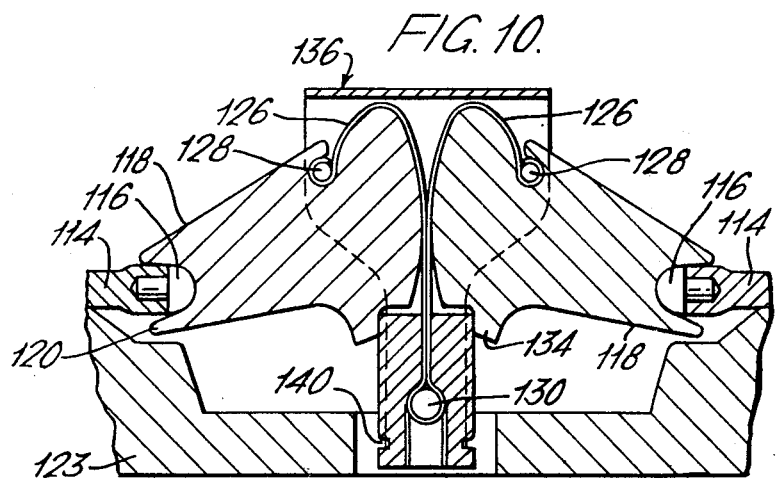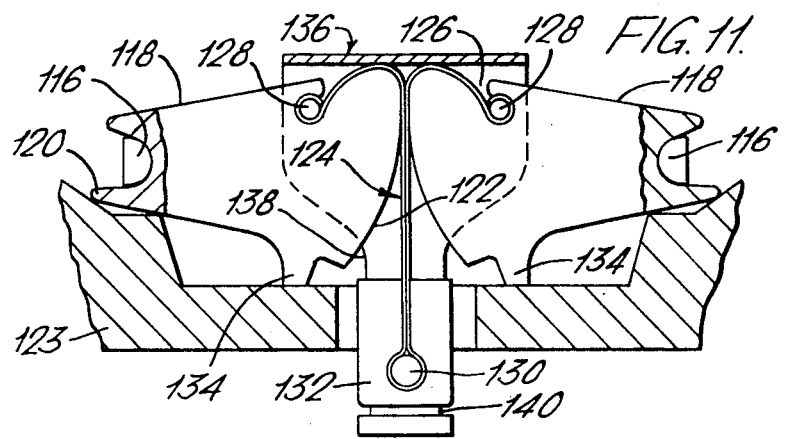

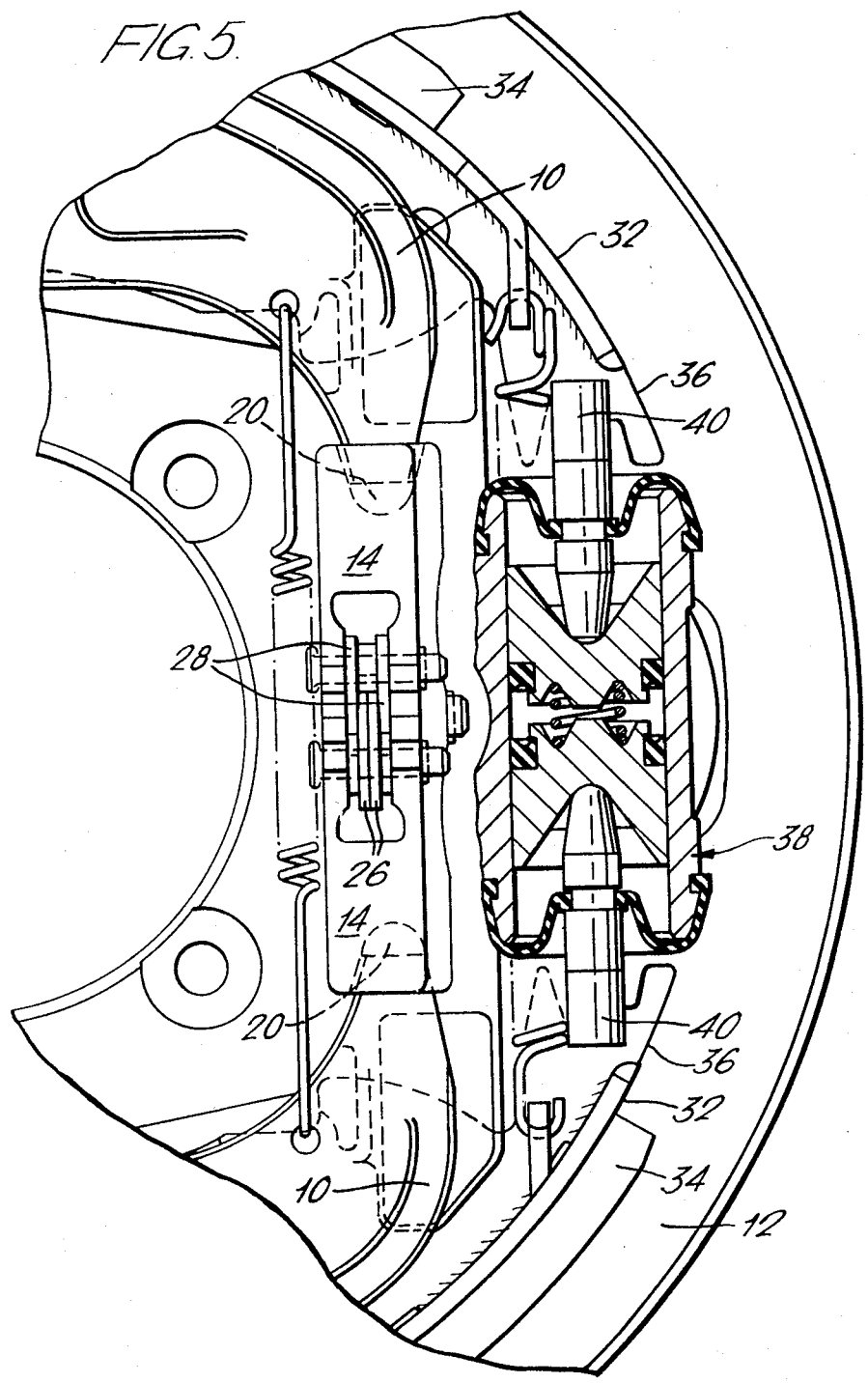

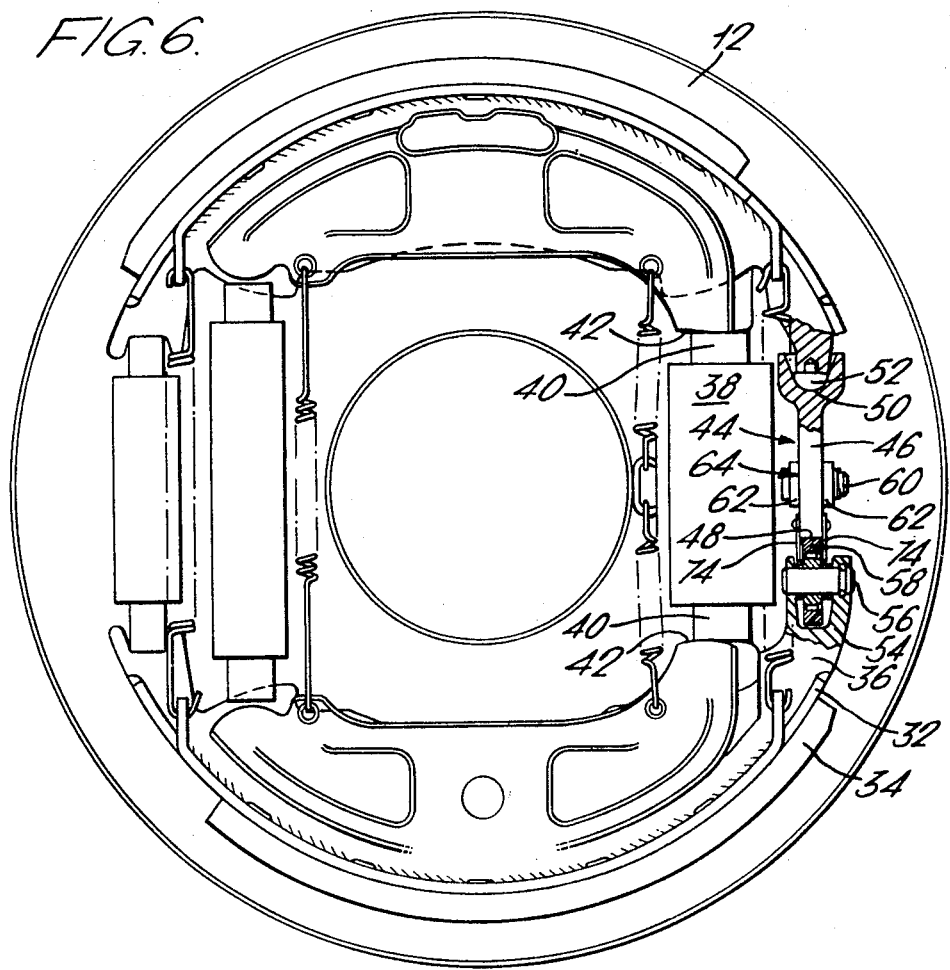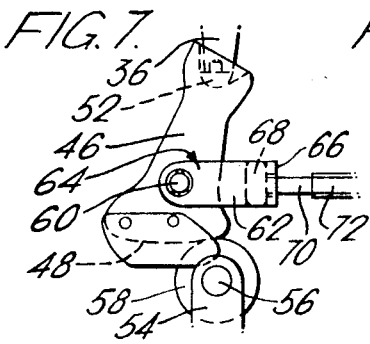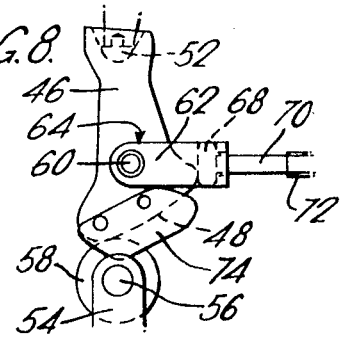

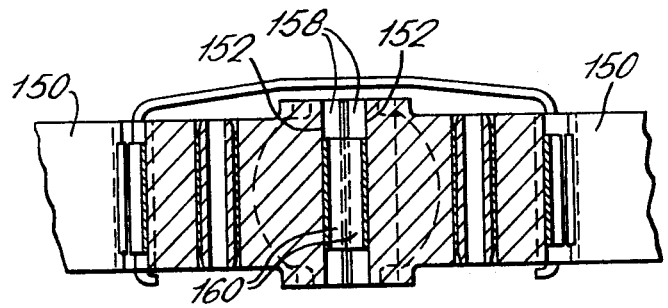
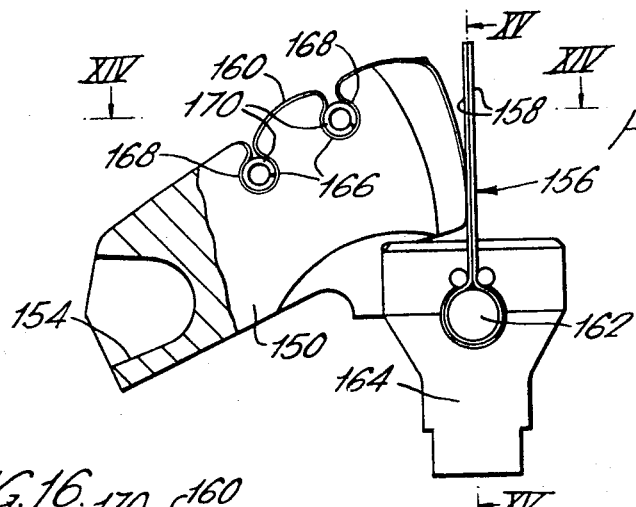
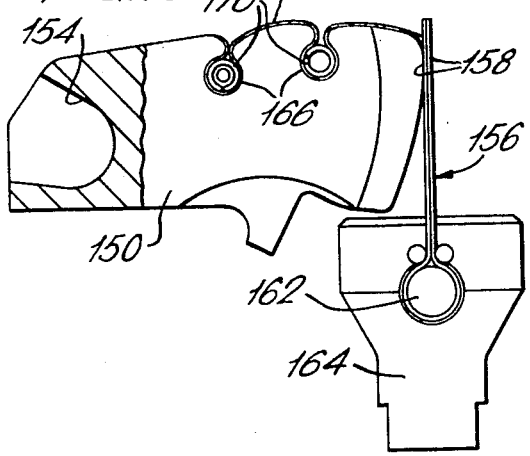
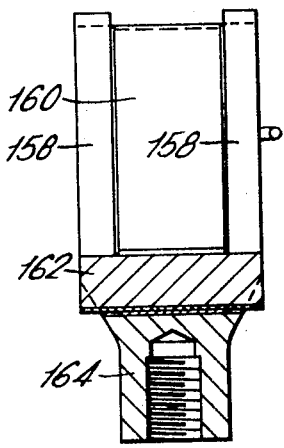

VEHICLE SHOE DRUM BRAKES

This invention concerns vehicle shoe drum brakes and relates more particularly to shoe drum brakes of the type in which a pair of spaced thrust members such as bellcrank levers or pushrods are acted upon by means including a pair of curved surfaces in rolling engagement with one another, the rolling motion being arranged during brake actuation to set up an expansion of said cam means which is transmitted to said thrust members for displacing the brakeshoes towards the brakedrum.

According to the present invention, there is provided a vehicle shoe drum brake in which a pair of independent, spaced aligned thrust members respectively engaged with opposed brakeshoes of said brake mounted on a brake backplate are acted upon by cam means formed with a pair of curved surfaces in rolling engagement with one another, the rolling motion being arranged during brake actuation to set up an expansion of said cam means which is transmitted to said thrust members for displacing the brakeshoes towards the brakedrum, said brake comprising operating means displaceable symmetrically relative to the cam means and along or in a direction parallel to a line tangential to the rolling curved surfaces thereof, and connecting means secured to said operating means and pivotally connected to said cam means for effecting said rolling motion, said connecting means additionally acting to guide said cam means and maintain the same in a predetermined phase relation during said rolling motion.

Preferably, a rolling or a rocking articulation generally similar to a ball and socket joint or a so-called knuckle joint is provided between the cam means and either or both of the thrust members. By virtue of such articulation, the actuating mechanism comprising the cam means and the thrust members is enabled to be self-aligning to accommodate such factors as manufacturing tolerances and brake lining wear.

In one embodiment of the invention, the cam means takes the form of a pair of quadrants with their curved surfaces rolling upon one another in complementary opposed relationship, each of said quadrants being in articulated engagement with one of said thrust members at a region spaced from said curved surface and a pull rod displaceable in the plane of the quadrants and symmetrically thereto is connected to each quadrant for causing said quadrants to execute a rolling movement one upon the other.

The connection between the quadrants and the pull rod may be flexible tension member which is interposed between the curved surfaces and is displaceable tangentially with respect thereto for causing the quadrants to roll one upon the other. The provision of such a tension member avoids the need which may otherwise be encountered to specially prepare said curved surfaces as by hardening and grinding treatment and makes it possible for the quadrants to be cast or stamped on a quantity basis with consequent economy in production. The tension member which conveniently is a flat flexible metal strip, for example made of hardened spring steel, may with advantage be of generally Y-shaped configuration, having two of its three extremities each adapted for connection to one or other of the quadrants and its other extremity adapted for connection to the aforementioned pull rod or to a brake cable or the like.

As an alternative to the tension member, the quadrants may be caused to roll upon one another by at least one pivotal link arranged between them and the pull rod. Preferably, however, each quadrant has a pair of pivotal links arranged one each side thereof adjacent its curved surface, the links being pivotally connected at one of their ends to the pull rod and at their opposite ends to a region of the quadrant remote from the pull rod.

Another embodiment of the invention includes a cam means employing only a single quadrant, which is in articulated engagement as aforementioned with an associated thrust member, the other thrust member having a roller pivoted to it and bearing against the curved surface of the quadrant.

Conveniently, in this latter embodiment, the quadrant is proved with side plates or cheeks extending from a region adjacent its curved surface and embracing the roller somewhat in the manner of a roller cage, in order to maintain operative alignment between the roller and the quadrant. The invention will be described further, by way of example, with reference to the accompanying drawings, in which:

FIG. 1 is a plan view of a part of one brake actuator assembly embodying the invention;

FIG. 2 is a section taken on the line II–II of FIG. 1 and showing the unit in the normal "off" position;

FIG. 3 is a section similar to that of FIG. 2 and illustrating the unit in the maximum "on" position;

FIG. 4 is a sectional detail taken on the line IV–IV of FIG. 2;

FIG. 5 is an elevation of a drum brake assembly incorporating the actuator unit of FIGS. 1 to 4;

FIG. 6 is a plan view of another embodiment of brake according to the invention;

FIG. 7 is a detail illustrated the cam means in the brake of FIG. 6 in the normal "off" position;

FIG. 8 is a similar detail showing the cam means in its "on" position;

FIG. 10 is a section taken on the line X–X of FIG. 9;

FIG. 11 is an elevation, partly in section similar to that of FIG. 10, showing the quadrants in an operated condition;

FIG. 12 is a sectional detail showing the relation of the saddle to the drum torque plate;

FIG. 13 is a detail of a modification of the actuator used in the brake illustrated in FIGS. 9 to 12;

FIG. 14 is a section taken on the line XIV–XIV of FIG. 13;

FIG. 15 is a section taken on the line XV–XV of FIG. 13; and

FIG. 16 is a detail similar to that of FIG. 13 showing the quadrant in an operated condition.

Figure 9:
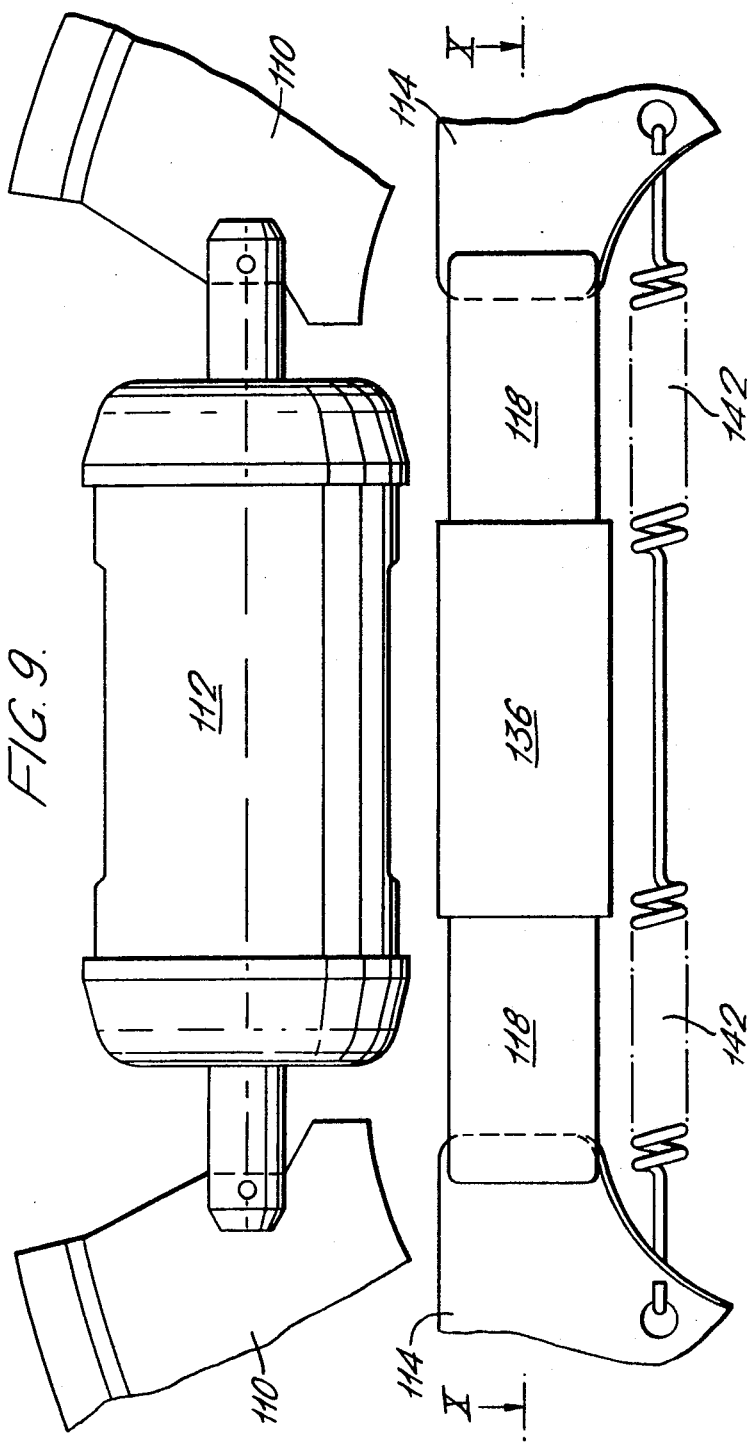
FIG. 9 is a front elevation of apart of another shoe drum brake embodying the invention.

Referring firstly to the brake actuator construction shown in FIGS. 1 to 4, a pair of thrust members or carriers 10 are arranged in spaced relation on a backplate or torque plate 12. Between the opposings ends of the thrust members 10 are situated a pair of quadrants 14 having curved surfaces which are arranged to roll upon one another, the end of each quadrant remote from its curved surface being formed with a relatively deep, part-spherical recess 16 constituting a seat for the ball end 20 of a pin 18 having a rebated stem which is welded to an adjacent part of the thrust member 10. The ball end 20 of the pin serves to articulate the thrust member to the quadrant 14.

At its end opposite the recess 16, each quadrant 14 will be seen to be formed with a curved surface 22 which is of part-circular configuration and which has a radius of the same order of length as that of the quadrant itself, the center of curvature of each surface 22 being eccentric to the center of symmetry of the associated recess 16, whereby rolling motion of the quadrants upon one another causes their other ends to be oppositely outwardly displaced, in turn displacing the thrust members 10. It will be noted that the point of contact or the pressure point between the curved surfaces of the quadrants lies on that side of the line joining the center of symmetry of the recesses 16 which is remote from the backplate 12.

In order to effect the required rolling motion, each quadrant 14 is pivotally connected to a pull rod 24 by means of a pair of links 26 and 28 respectively which are received within a central recess 29 of the curved surface 22 of the quadrant with the pair of pivotal links 28 side-by-side in the center of the recess 29 and one link of the pair of links 26 arranged on each side of the pair of links 28. The pull rod 24 is bifurcated at its end connected to the links 26, 28 and will be observed to pass with substantial clearance through a hole 30 formed in the torque plate 12.

The actuator mechanism described with respect to FIGS. 1 to 4 is shown installed in a drum brake assembly in FIG. 5. The brake assembly will be seen to incorporate a pair of opposed brakeshoes 32 each carrying the usual lining 34 of friction material and each having a web 36 which is connected in any convenient manner to a respective one of the thrust members 10. Between opposing ends of the brakeshoe webs 36 is arranged a conventional hydraulic actuator 38, axially opposed pushrods 40 or the like of which engage the webs 36 to displace the brakeshoes away from one another when the actuator 38 is energized by the application of pressure fluid thereto in the usual manner. The mechanical actuator assembly FIGS. 1 to 4 will be seen to be arranged on the torque plate 12 at a position radially inwardly of the hydraulic actuator 38 and makes it possible for the brakeshoes 32 to be displaced independently of the hydraulic actuator 38.

A modification of the actuator described above is shown in FIGS. 6 to 8, wherein brakeshoes 32 are carried as before on a backplate 12 and are arranged to be displaced by a hydraulic actuator 38 having its pushrods 40 bearing on abutments 42 of the shoe webs 36. In this instance, the hydraulic actuator 38 is positioned radially inwards of the mechanical actuator, which is generally designated 44 and includes a quadrant 46 formed at one end with a curved surface 48 and provided at its opposite end with a part-spherical recess 50. The recess 50 constitutes a seat for a dome-ended pin 52 which is mounted in an end of the brakeshoe web 36 adjacent the quadrant 46. The corresponding end of the other brakeshoe web is bifurcated at 54 to provide a mounting for a pin 56 on which is carried a roller 58 engaging the curved surface 48 of the quadrant. Intermediate its ends, the quadrant is pivotally connected by further pin 60 to a pair of pivotal links 62, positioned one each side of the quadrant and constituting the limbs of a U-shaped stirrup 64 having a crown portion 66 wherein is seated a complementarily shaped lug 68 terminating a threaded stem 70 which is connected to a pull rod 72 or other required operating member such as a brake cable. FIG. 7 illustrates the quadrant in its unoperated position and FIG. 8 shows it in the operated position with the curved surface having travelled across the roller, resulting in consequent displacement of the opposed shoe web ends. It will be noted that, at its end formed with the curved surface 48, the quadrant 46 carries an end cheek 74 at each side thereof, the cheeks 74 embracing the roller 58 to guide the relative movement between the same and the quadrant.

An alternative to the displacement of the quadrants by pivotal links is illustrated in the embodiments of the invention shown in FIGS. 9 to 16.

In the construction shown in FIGS. 9 to 12, the brake comprises a pair of brakeshoes 110 with a conventional hydraulic actuator or expander 112 arranged between the brakeshoe ends in the usual manner for displacing the shoes towards the brake drum (not shown).

Independently of the hydraulic actuator 112, the brakeshoes 110 are also arranged to be displaceable mechanically by means including thrust members or carriers 114 lying to one side of the brakeshoe web and each acting over its central region with a central region of the associated brakeshoe. The other end of each thrust member 114 carries a domed pin 116 by which it is articulated to a quadrant 118, and end of the quadrant which engages the pin 116 being formed for this purpose with a deep V-shaped groove or recess 120 the base of which extends into a generally hemispherical recess constituting a seating for the dome of the pin 116. At its opposite end, each quadrant 118 is formed with a curved surface 122 of part-circular configuration and having a radius substantially equal to the length of the quadrant itself, the arrangement being such that the center of each circle is eccentric to the center of symmetry of the associated recess 120 in order that rolling motion of the quadrants relative to one another may result in oppositely directed outward displacement of their opposite ends.

It will again be noted that the point of contact or the pressure point between the curved surfaces of the two quadrants lies on that side of the thrust members 114 which is remote from a backplate or torque plate 123 on which the thrust members and the remaining components of the brake are carried.

Between the two quadrants 118 there is interposed a generally Y-shaped flat flexible spring 124 made of hardened steel with the end of each arm 126 of the Y bent over to form an eye which is engaged pivotally over a pin 128 carried towards the upper edge of each quadrant as viewed in FIG. 10. The lower eye of the stem of the Y is engaged in a pin 130 carried by a coupling member 132 passing through the torque plate 123 and adapted, for example by a screwed connection, for securing to a brake cable or rod (not shown). Thus, for the purpose of operating the brake, a pull exerted on the coupling member 132 will cause the tension member 124 to be displaced tangentially relative to the quadrants to draw the upper ends of the quadrants down towards the torque plate 123 while the rolling action produced by the curved surfaces 122 of the quadrants will cause an expansion movement to be imparted to the two thrust members 114 by way of the domed pins 116. Lugs 134 formed on the lower edges of the quadrants 118 adjacent the curved surfaces 122 serve both to guide the rolling motion of the quadrants and also, by abutting the torque plate 123 to limit the stroke of the quadrants and hence of the thrust members 114.

Adjacent ends of the tension member 124 and of the quadrants 118 are confined within a saddle 136 of generally U-shaped configuration, with the legs of the U continuing into a pair of flexible arms 138 of reduced width. The free ends of the arms 138 are turned in to engage in a groove 140 provided in the coupling member 132 for causing the saddle to move with the coupling during braking. In FIG. 10, the expander is shown in its normal rest position, into which it is urged by return springs 142 for the thrust member 114.

The provision of the tension member 124 avoids any need to provide specially prepared hardened and ground surfaces on each of the quadrants 118 and enables the quadrants economically to be cast in the desired shape. In the strap form illustrated in FIGS. 9 to 12, the tension member is itself simple and economic in manufacture and additionally acts to tension the brake-actuating linkage.

It will be appreciated that a number of modifications may be made to the brake construction shown in FIGS. 9 to 12 and that, for example, while the illustrated embodiment employs quadrants 118 which are both displaced responsive to tangential movement of the strap 124, it is possible to arrange the brake in such a way that one of the thrust members is pivotal but remains linearly fixed relative to the brake backplate and the whole thrust member assembly is circumferentially displaceable when the tension member is pulled. In this way, the whole brake actuating movement is applied to the other, free thrust member.

FIGS. 13 to 16 illustrate a brake actuator generally similar to that described immediately above but with a modified form of tension member. As evident more particularly from FIG. 14, a pair of quadrants 150 are formed at their inner ends with curved surfaces 152 arranged to roll one upon the other, the outer end of each quadrant being provided as previously with a recess having a hemispherical base portion, one such recess 154 being visible in FIGS. 13 and 16.

Between the two quadrants 150, there is interposed a tension member generally designated 156 and including a pair of relatively thick strips 158 of spring steel material which are spaced laterally apart from one another across the width of the quadrants, thereby defining a channel between them, together with a strip 160 of relatively thinner material and lying in the channel defined by the thicker strips 158. At their central regions, all the strips 158 and 160 are bent around a pin 162 mounted in a coupling member 164 intended for attachment as to a pull rod or other actuating member (not shown). The edges of the quadrants 150 remote from the coupling member 164 are formed with spaced, keyhole slots 166 and the outer end regions of the thinner, inner strips 160 of the tension member are formed with correspondingly spaced and complementarily shaped, open loops 168 which are slipped as a pivotal fit into the slots 166 and retained therein by push-fitted, circumferentially discontinuous sleeves 170, the outer ends of the strips 160 of the tension member thus being securely anchored to the quadrants.

As will be appreciated, when the actuator is operated to expand the brakeshoes against the brakedrum (not shown), the compressive forces transmitted through the quadrants and on to the outer strips 158 of the tension member increase. Therefore, the frictional forces between the outer strips and the quadrants and between the mating faces of the strips 158 themselves increase and cause the outer strips to take up some of the tensile load experienced by the thinner, inner strips 160. The latter are thereby relieved of some of the tensile stresses which they would otherwise experience and, as the quadrants rotate, are also relieved of excessive bending moments. In this way, premature metal fatigue is avoided.

It will also appreciated that in all the embodiments of the invention herein described, the part-circular curved surfaces of the quadrants have centers of curvature which remain fixed as the quadrants roll upon one another. The ratio between the radius of curvature of the quadrants and the spacing of their centers of curvature from the line joining the centers of symmetry of the articulations between the quadrants and the thrust members is then a measure of the ratio between the input force applied to the pull rod and the output force obtained from the quadrants. However, as an alternative forming the quadrants with part-circular surfaces either or both of them may in each embodiment be formed with curved surfaces of noncircular configuration and in such a case the aforementioned ratio will vary, as the quadrants roll, in a manner predetermined by the nature of the noncircular curved surfaces.

I claim:

1. In a vehicle shoedrum brake of the type in which a pair of independent, spaced, aligned, thrust members respectively engage with opposed brakeshoes of said brake mounted on a brake backplate and acted upon by cam means comprising a pair of quadrants having curved surfaces in rolling engagement with one another, the rolling motion being arranged during braking actuation to set up an expansion of said cam means which is transmitted to said thrust members for displacing the brakeshoes toward the brakedrum, a pull rod displaceable symmetrically relative to the cam means and in a direction parallel to a line tangential to the rolling curved surfaces of said quadrants, connecting means between the quadrants and the pull rod comprising a flexible tension member interposed between the curved surfaces and displaceable tangentially with respect thereto for causing the quadrants to roll one upon the other, said tension member having an intermediate region secured to said pull rod and a pair of end regions each pivotally connected to one of the quadrants.

2. A brake as set forth in claim 1, wherein the tension member is flat, flexible strip of hardened spring steel, having a generally Y-shaped configuration with two of its three extremities each adapted for connection to one of the quadrants and its other extremity adapted for connection to the pull rod.

3. A brake as set forth in claim 2 including a pair of strips of spring steel material spaced laterally apart from one another across the width of the quadrants, said strips being thicker than said first-mentioned strip and defining a channel between them for the reception of said first-mentioned strip, said thicker spring strips being interposed between the rolling surfaces of the quadrants and having central regions connected to said pull rods, said outer end parts extending freely outwardly between said quadrants to afford rolling surfaces for said quadrants.